(12) United States Patent
Thoma et al.

(10) Patent No.: US 6,343,471 B1
(45) Date of Patent: Feb. 5, 2002

(54) HYDROSTATIC TRANSMISSIONS AND TRANSAXLES

(75) Inventors: Christian Helmut Thoma; George Duncan McRae Arnold, both of Jersey (GB)

(73) Assignee: Hydro-Thoma Limited, Jersey (BI)

( * ) Notice: Subject to any disclaimer, the term of this patent is extended or adjusted under 35 U.S.C. 154(b) by 0 days.

(21) Appl. No.: 09/541,906

(22) Filed: Apr. 3, 2000

(51) Int. Cl.[7] ........................ F16D 39/00; F16H 57/02
(52) U.S. Cl. ........................................ 60/487; 74/606 R
(58) Field of Search ............................ 60/487; 74/606 R

(56) References Cited

U.S. PATENT DOCUMENTS 5,979,270 A    11/1999   Thoma et al.
6,076,428 A  *  6/2000   Thoma et al. ............. 74/606 R

* cited by examiner

Primary Examiner—John E. Ryznic
(74) Attorney, Agent, or Firm—Young & Thompson

(57) ABSTRACT

An axle assembly for use in lawn tractors, pedestrian walk-behind mowers and snow blowers in the form of a housing having an internally disposed hydrostatic transmission and speed reducing gearing. An input shaft supported in the housing for driving a variable-displacement hydraulic pump of the hydrostatic transmission, and where the motor is drivingly connected through the speed reducing gearing to an output axle shaft or shafts. A mechanical differential disposed within said housing for applications requiring differential speeds of said axle output shafts. The housing being formed by three housing elements in which two are disposed adjacent one another on one side of a parting plane and the third one disposed on the opposite side of the parting plane. Of the two internal chambers formed by the three housing elements, one chamber contains the hydrostatic transmission and the other chamber contains the speed reducing gearing. A connecting shaft spans between the chambers and connects the motor to the gearing and where one of the three housing members is formed with passages integral with its wall structure for fluidly coupling the hydraulic pump to the hydraulic motor.

28 Claims, 13 Drawing Sheets

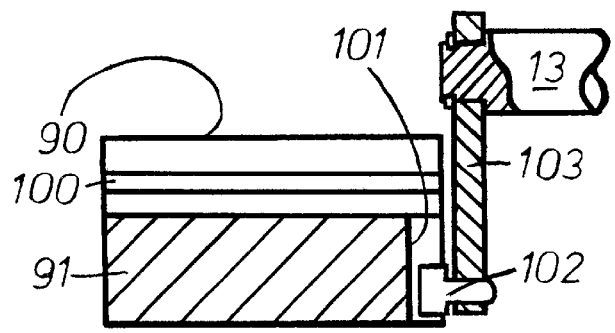
FIG. 12
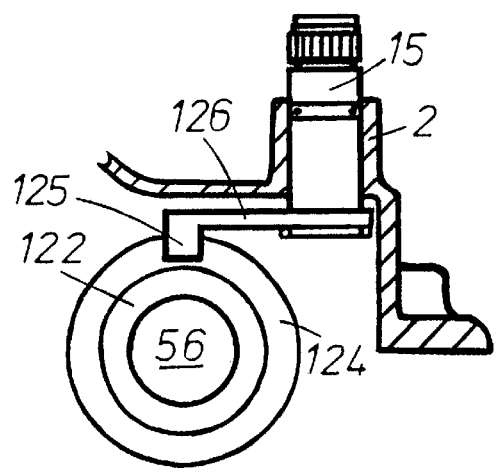
FIG. 13
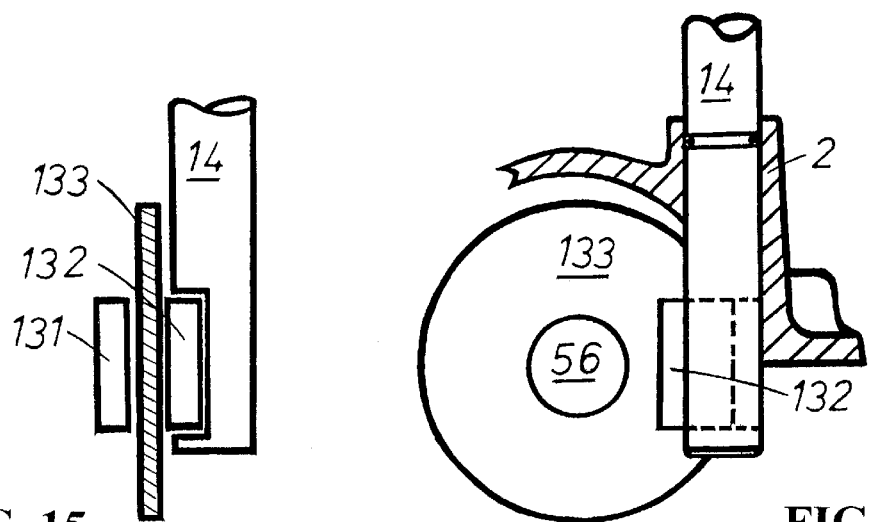
FIG. 15
FIG. 14

HYDROSTATIC TRANSMISSIONS AND TRANSAXLES

This invention relates to hydrostatic transmissions as well hydrostatic transaxles which are now in increasing usage for lawn care and other outdoor power equipment duties as the preferred choice for power transmission drive lines; for example, lawn and garden tractors; pedestrian walk-behind mowers and snow blowers.

Hydrostatic transaxles of the type currently sold in the marketplace require careful assembly and service practices in order to avoid certain problems occurring that may result in lower than expected operational life of the product. Further, the application in which the device is used must not overload the transmission to such an extent that the rise in the temperature of the operating fluid lowers performance, most noticeable as a drop in vehicle speed. Hydrostatic transmissions operate most effectively and efficiently when they are constructed with exceedingly small clearances between their reciprocating and sliding elements. The transmission of power by such hydrostatic transmissions has now become widespread and when well designed for the intended application, the attendant small fluid leakage loss from the internal pressurised circuit during operation which is inherent with this type of speed changing device is generally considered unimportant as the resulting retardation in vehicle speed most often goes largely unnoticed by the end user. Hydrostatic transmissions work well and have a long and useful life so long as the level of contamination suspended in the power transmission fluid remains low. High levels of contamination carried by the power transmitting fluid can rapidly wear out the aforementioned fine clearances resulting in an increase in fluid leakage, especially during high pressure operation. However, wear can take place even when the level of contamination in the hydraulic fluid remains low, and such wear accelerates when the temperature of the working fluid becomes so high that the fluid viscosity decreases to the point when lubrication over the sliding surfaces is inadequate. In this regard, it is preferable although not essential, to keep the lubricating fluid in the gear compartment segregated from the fluid in the hydrostatic compartment.

It is important during initial product assembly in the factory as well as at subsequent service repair intervals to attempt to minimise the chance for contamination to enter the chamber surrounding the working components of the hydrostatic transmission. The contaminated of such components can occur during handling on the assembly lines, especially if the mechanical gearing is assembed at the same time. It follows therefore, that if the hydrostatic transmission could be fully assembled with the minimum of gear components being handled, and sealed in the housing prior to the remaining elements associated with the reduction gearing and differential being added, there would be advantage.

It is also of great importance to include such features in the design of the device to help ensure that the temperature of the power transmitting fluid remains within acceptable limits. At present with the hydrostatic transaxles presently manufactured, the outer housing provides a sump into which a center section is located and where such fluid passages are contained within the center section. As a result, effective cooling of the fluid passing through the passages is hindered as the fluid surrounding the center section acts as a insulating medium to slow down the rate of heat transfer from the power transmitted fluid in the passages to the surrounding housing radiator. It would therefore be an advantage if the fluid passages connecting the pump and motor of the hydrostatic transmission could be positioned integral with the wall structure of the surrounding housing and as close as possible to the input shaft driven cooling fan.

In the present art of hydrostatic transmissions when used in combination with related transaxle apparatus, it is preferable that the parking brake device be included internally inside the transaxle housing rather than being situated on the exterior to be affected by exposure to damp and dirty conditions in the environment. However, location of such a brake internally within the transaxle housing is a problem if worn brake lining debris finds its way into the power transmitting fluid of the hydrostatic transmission. What is therefore needed is a protected parking brake for the hydrostatic transaxle for location inside the same chamber where the gearing of the transaxle is located such that debris worn away from the brake is prevented from entering the hydrostatic compartment. What is further needed is an internal brake and disengage mechanism for a transaxle apparatus whereby any contamination generated by these two mechanisms does not find its way into the hydrostatic compartment, but will still allow simple repairs to be effected. For example, the replacement of a worn brake shoe without having to dissemble the housing containing the hydrostatic transmission. In many hydrostatic transaxles presently manufactured, the hydrostatic transmission as well as the gearing and differential all operate in the same fluid bath, this being often referred to as a common sump design. A disadvantage of the common sump approach is that once the fluid is heavily contaminated with water forming a sludge mixture with material worn from the gears, it shows up as a noticeable drop in performance, and the unit is either a throw-away or requires a complicated and expensive repair. There would therefore be an enormous advantage if the compartment containing the gearing could be easily assessable to be cleaned and on occasion, receive clean lubricating fluid. There would be a further advantage if the gearing were to be operating with the bare minimum of lubricating fluid rather then be fully submerged as is usual in the common sump arrangement. A low level of fluid for the gearing corresponds to an improved overall operating efficiency of the hydrostatic transaxle as the turning losses are less.

SUMMARY OF THE INVENTION

From one aspect the invention consists of a housing structure for a hydrostatic transaxle where the housing construction comprising three housing elements that interrelate to form a chamber for the hydrostatic transmission components and a chamber for the geared components. An input shaft is supported in the housing and extends into the chamber containing the hydrostatic transmission to drive the hydraulic pump, and where an output shaft is also supported in the housing to extend into that chamber containing the geared components. In instances when a mechanical differential is also located within the chamber containing the geared components, the output shaft then comprises two shafts that extend from the differential in opposite directions. Within the chamber containing the geared components, the output shaft or shafts is drivingly engaged to the speed reduction gears and where the gears are driven by a connecting shaft that forms the power transmitting link between the hydraulic motor in the hydrostatic chamber and the geared components in the gear chamber. A bridging element spans across the chambers, the bridging element can be in the form of a cylindrical bearing member seated in a pocket in the larger of the three housing elements as well as in respective pockets provided in the two smaller housing elements. Anaerobic sealant being applied to all three pockets during assembly of the device in order to prevent any loss of fluid from the chambers, and where a rotary shaft seal or filter element that act as a fluid barrier can be placed at the interface between the housing elements to prevent at a minimum, substantial sized particles of contamination generated in the gear compartment from entering the hydrostatic compartment. Although best achieved through the inclusion of a fluid barrier such as a rotary seal surrounding the shaft connecting the hydrostatic unit to the gearing allowing a substantially dry sump for the gears to operate in, the alternative being a filter element such as a sintered hollow plug disposed in a communication passage connecting the compartments together to provide a solution for a common sump.

It is therefore an object of this invention to at least minimise and preferably entirely eliminate the danger of contamination generated in the gearing compartment from entering the compartment containing the hydrostatic transmission.

It is a further object of the invention to situate the parking brake inside rather than outside the transaxle. Presently most parking brakes for transaxles are located external of the housing on a brake-shaft such that the brake assembly is accessible should worn brake shoes need replacing. However, in the event that the vehicle operator forgets to release the brake before driving the vehicle, the resulting heat generated at the brake can be high enough to cause the seal surrounding the brake-shaft to fail. A failed oil seal results in the loss to the environment of the lubrication fluid in the sump and most often the hydrostatic unit needs to be replaced. It is therefore an object of the invention to position the brake assembly within the chamber containing the gearing so that any heat generated at the brake is absorbed by the surrounding lubricating fluid, or in the event of a failed oil seal, a repair can be undertaken with ease. It is a still further object of the invention to provide a new solution that would allow worn elements in the gear compartment such as the brake pads of an internal parking brake to be replaced without having to disturb the hydrostatic components. The ease of replacing worn brake parts without the dismantling of the whole transaxle housing structure would be economically advantageous to the industry thereby allowing the service agent to effect such simple repairs in the field.

Operational performance of the hydrostatic transmission can be enhanced by improving the heat dissipating characteristics of the surrounding housing structure. It is therefore a still further object of the invention to improve the performance of the hydrostatic transmission and make its less sensitive to wear from contamination by positioning the fluid passages interconnecting the hydraulic pump and hydraulic motor integral with the wall structure of the housing and as close as possible to the input shaft driven cooling fan.

In one form thereof, the hydrostatic transaxle of the invention comprises an axle driving assembly comprising a housing constituted by first and second housing elements disposed adjacent one another on one side of a parting plane, and a third housing element disposed on the opposite side of said parting plane and connected to each of said first and second housing elements, said first and third housing elements together defining a first chamber in which a hydrostatic transmission is disposed and said hydrostatic transmission comprising a hydraulic pump and hydraulic motor, and said second and third housing elements together defining a second chamber in which a mechanical differential is disposed, said hydrostatic transmission and said mechanical differential being operatively connected together by speed reducing gearing disposed within said housing; and wherein one of said housing elements is provided with first and second fluid passages integral with its wall structure for fluidly coupling said hydraulic pump with said hydraulic motor.

BRIEF DESCRIPTION OF THE DRAWINGS

The above mentioned and other novel features and objects of the invention, and the manner of attaining them, may be performed in various ways and will now be described by way of examples with reference to the accompanying drawings, in which:

FIG. 12 depicts the swash-plate assembly for the hydraulic pump.

FIG. 13 depicts one form of internal disengage mechanism for the hydrostatic transaxle.

FIG. 14 depicts a form of internal brake for the hydrostatic transaxle.

FIG. 15 is a further view of the internal brake of FIG. 14.

BRIEF DESCRIPTION OF THE INVENTION

As shown as the first embodiment of the invention in FIGS. 1 to 21, the hydrostatic transaxle has an outer housing comprising two upper cover elements called the transmission cover element 1 and the gear cover element 2 and a lower case element 3. The inter-relationship between these housing elements is best seen in FIGS. 1 to 4, and for purposes of further definition, the transmission cover element 1 will be referred to as the first housing element, the gear cover element 2 as the second housing element and finally the case element 3 as the third housing element.

Figure 2:
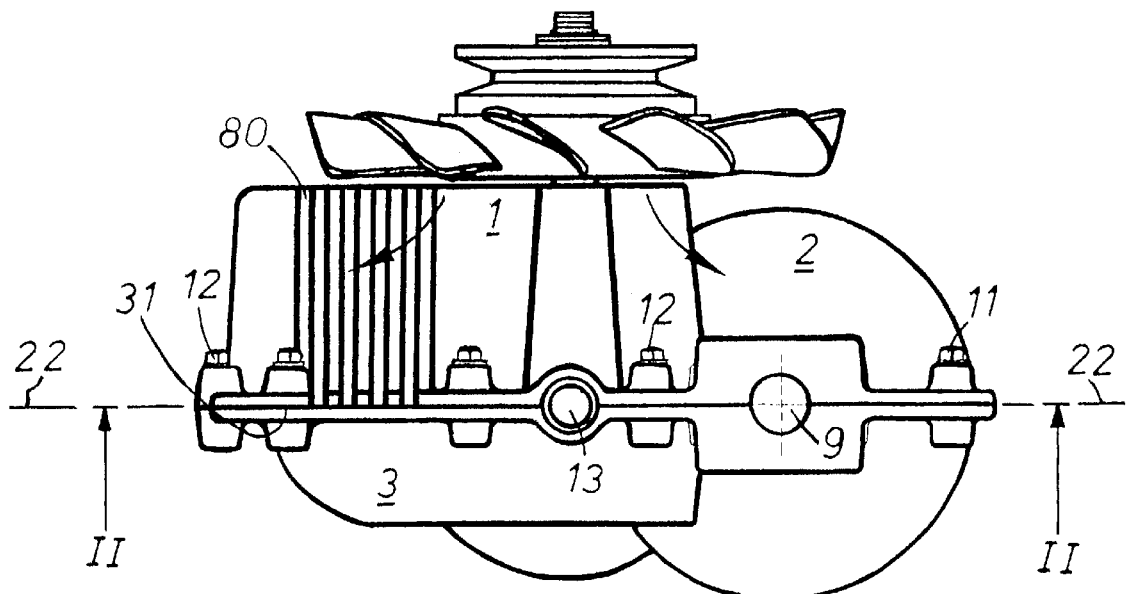
FIG. 2 is an external view of the hydrostatic transaxle from the opposite side of FIG. 1.
Figure 1:
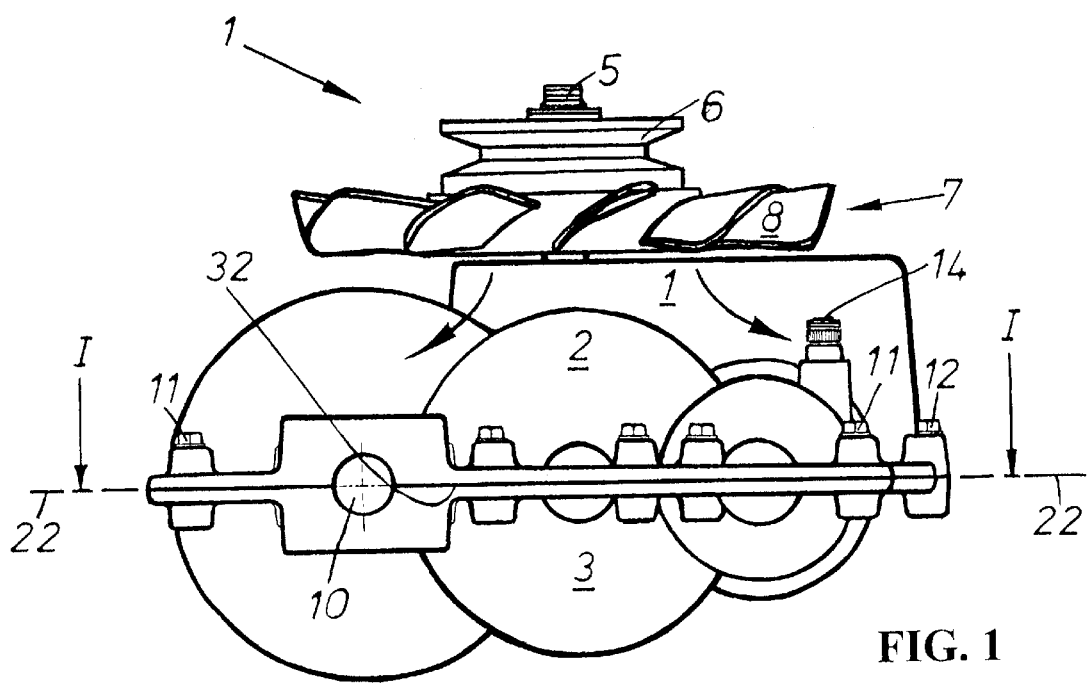
FIG. 1 is an external side view of the hydrostatic transaxle according to the invention.
Figure 3:
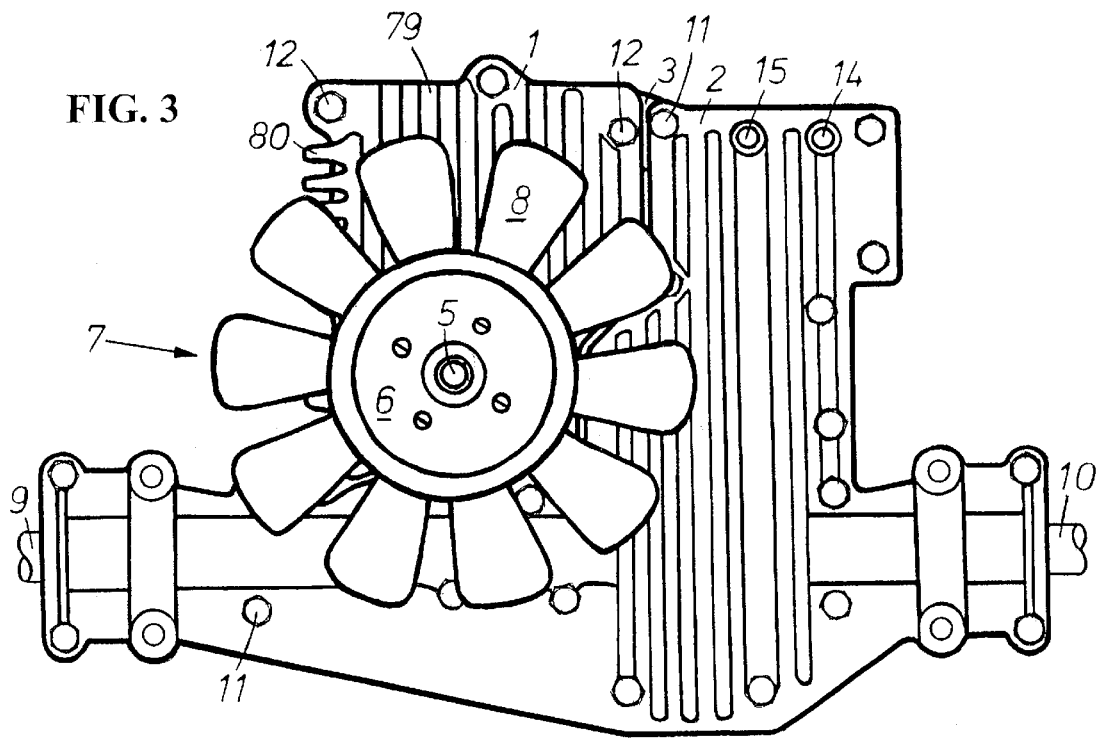
FIG. 3 is an external view from above of the hydrostatic transaxle with the cooling fan disposed on the input driveshaft.
Figure 4:
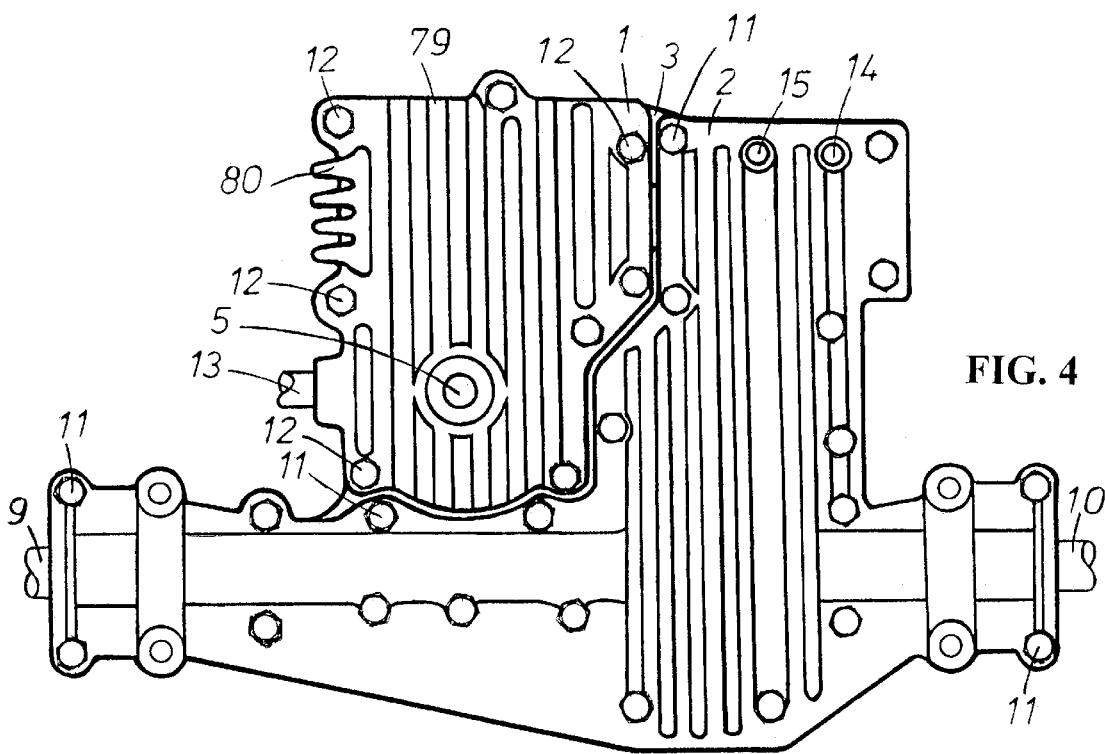
FIG. 4 is the same view as FIG. 3 with the cooling fan omitted.

An input drive shaft 5 is supported in the first housing element 1 and a vee belt pulley 6 as well as a cooling fan 7 with a series of blades 8 are fixed to the input shaft 5. As shown in FIGS. 1 & 2, pair of axle shafts 9, 10 are supported between second and third housing element 2, 3 and where a series of bolts 11 lock second and third housing element 2, 3 together. An independent series of bolts 12 lock first and third housing element 1, 3 together and where a speed control shaft 13 is supported between first and third housing element 1, 3. A pair of spindles project vertically from the upper surface of second housing element 2, spindle 14 being provided to operate the internal parking brake whereas spindle 15 is providing to operate the internal mechanical disengage device.

Figure 5:
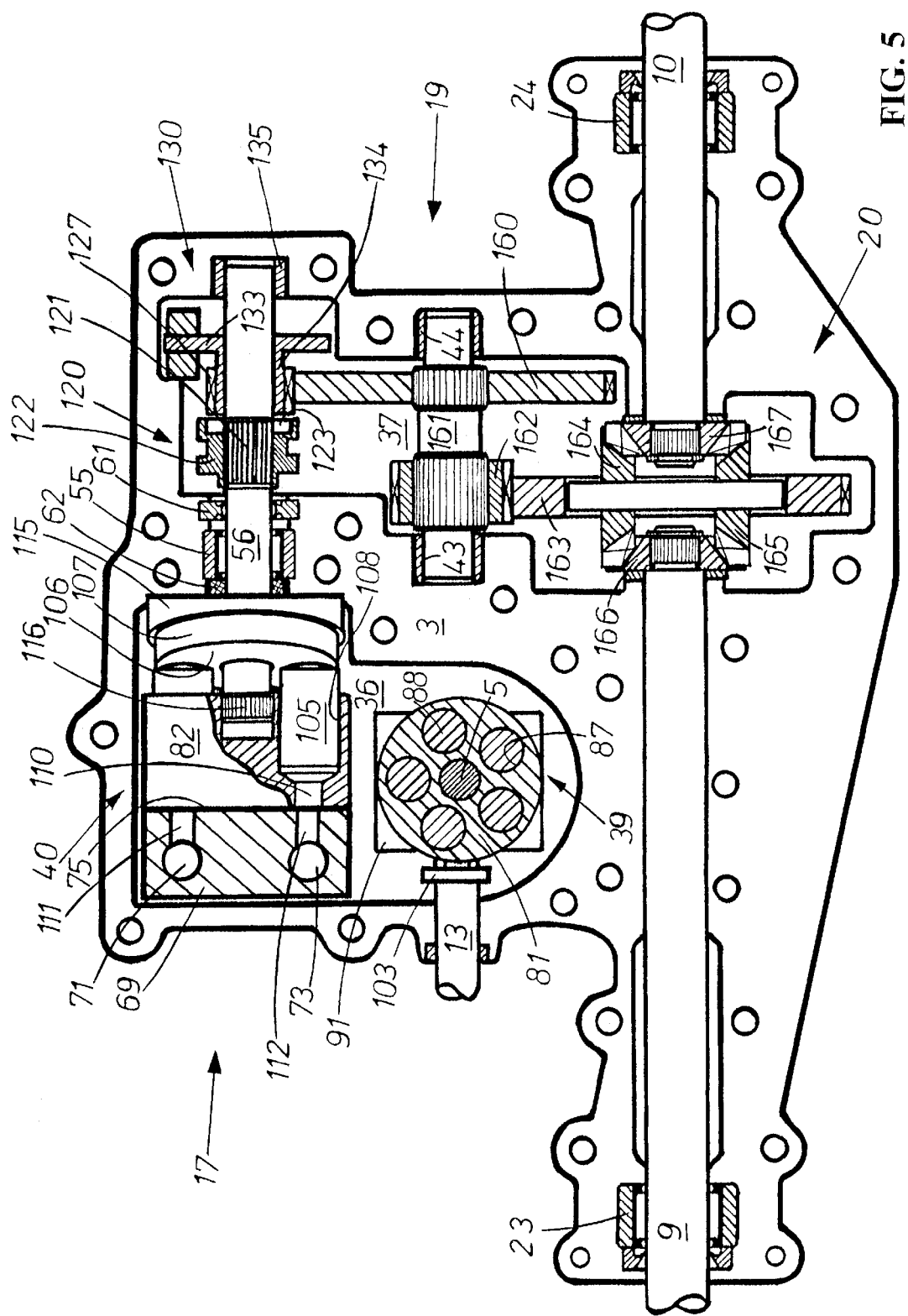
FIG. 5 is a plan view of the hydrostatic transaxle along the section line I—I in FIG. 1.
Figure 6:
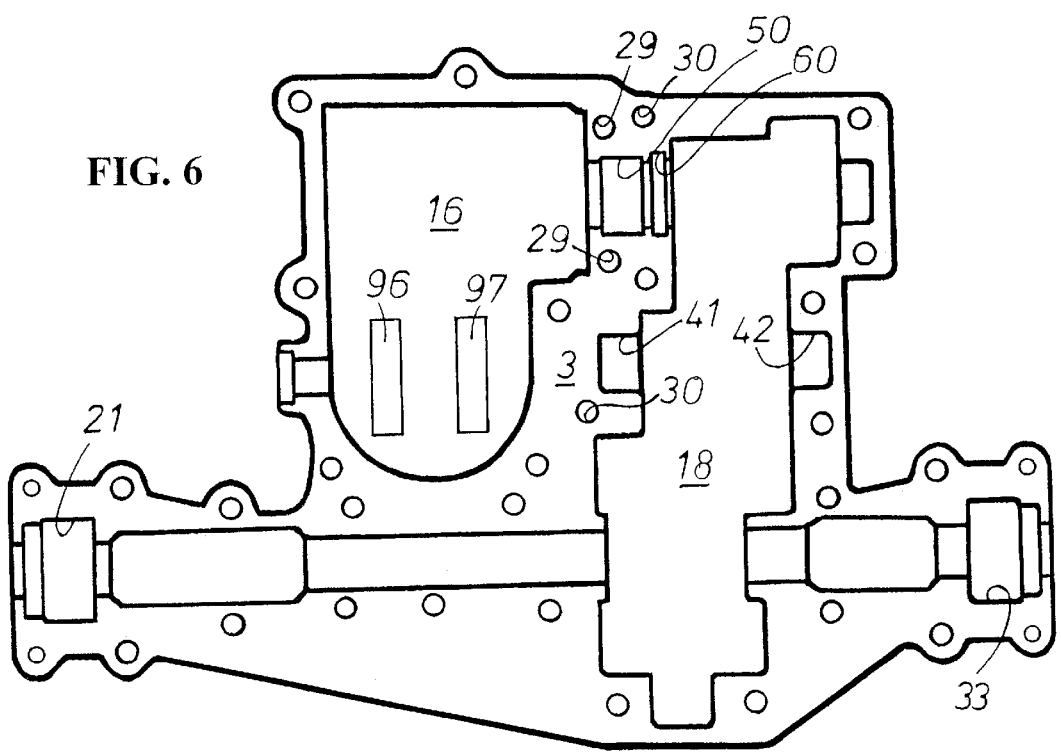
FIG. 6 depicts the interior of case housing element of FIG. 5 with all internally disposed elements.

With particular reference to FIGS. 5 & 6, the third housing element 3 has on its top side two cavities that are sunken from that surface, the first cavity 16 providing space for the hydrostatic transmission designated by arrow 17 and the second cavity 18 providing space for various elements such as comprise the speed reducing gearing designated by arrow 19 and mechanical differential designated by arrow 20 (when required).

A number of semi-circular pockets being provided in third housing element 3 to support various shafts and bearings, for instance, such as pockets 21, 33 for bearings 23, 24 for the output transmission shaft which, as shown in this particular embodiment, comprises the two output axle transmission shafts 9, 10.

Figure 7:
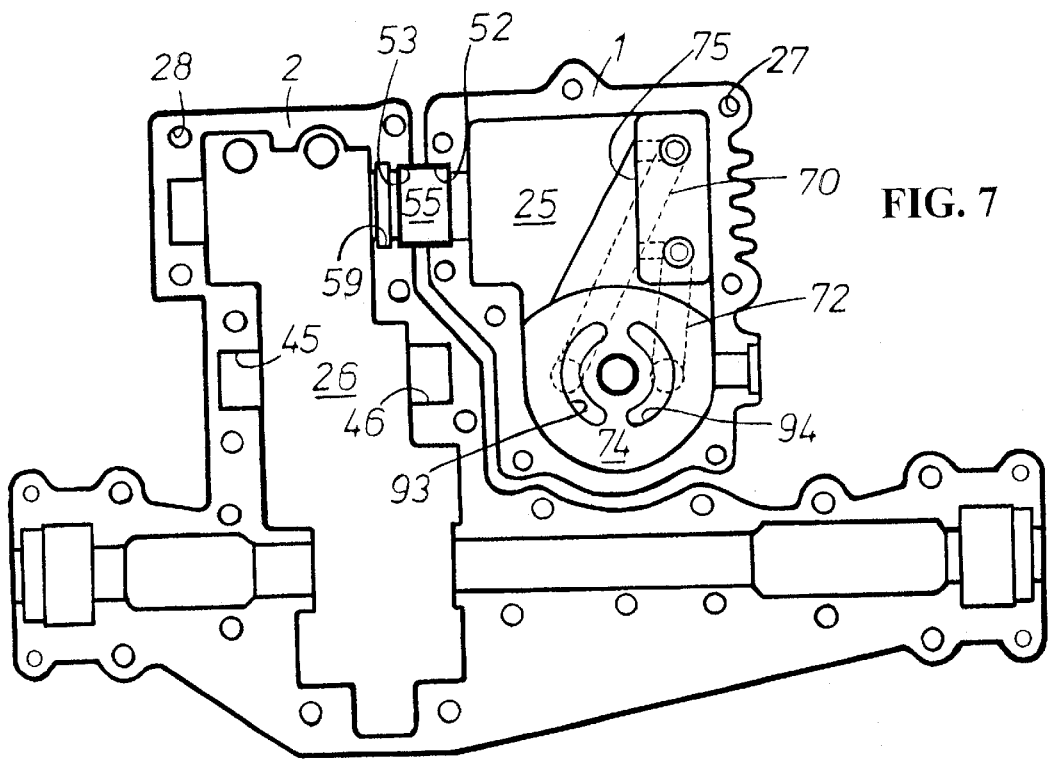
FIG. 7 is a plan view along the section line I—I in FIG. 2. to show the interior of the cover housing elements as well as the bridging element used in connecting the cover housing elements together.
Figure 8:
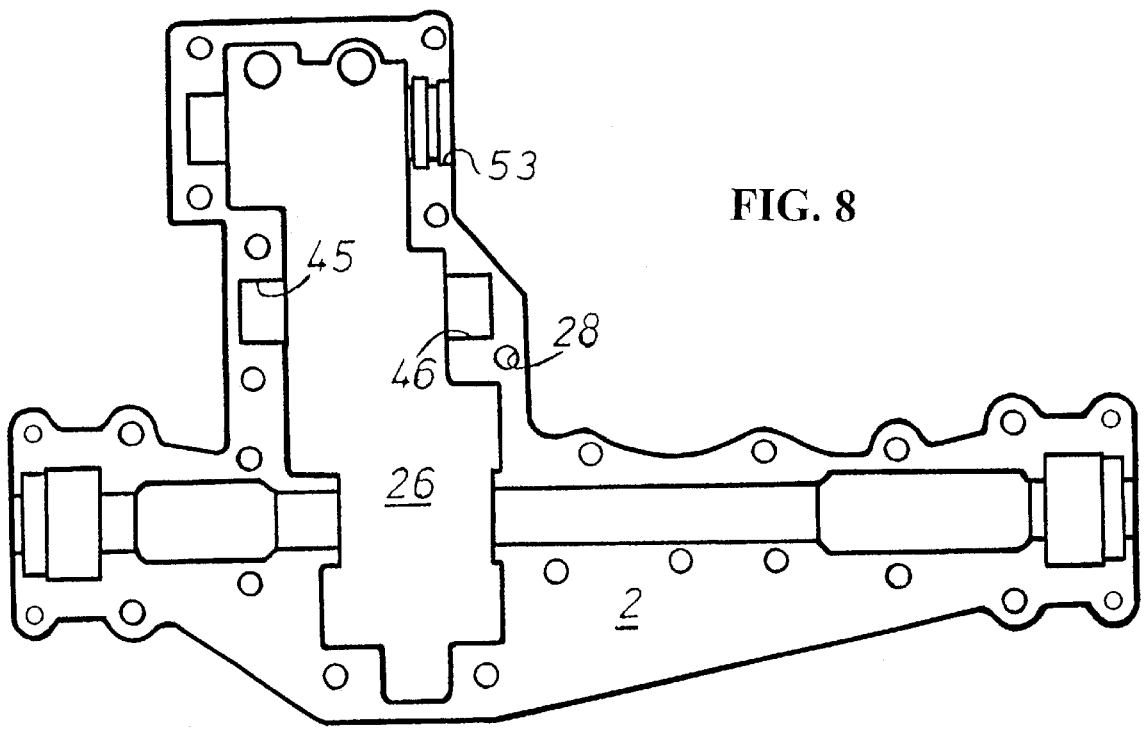
FIG. 8 is a view of the axle housing cover element of FIG. 7.
Figure 9:
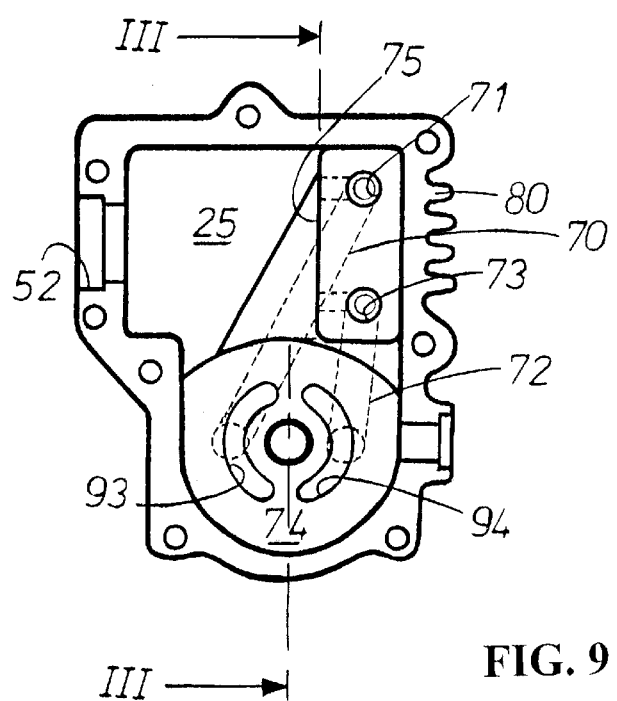
FIG. 9 is a view of the hydrostatic housing cover element of FIG. 7
Figure 10:
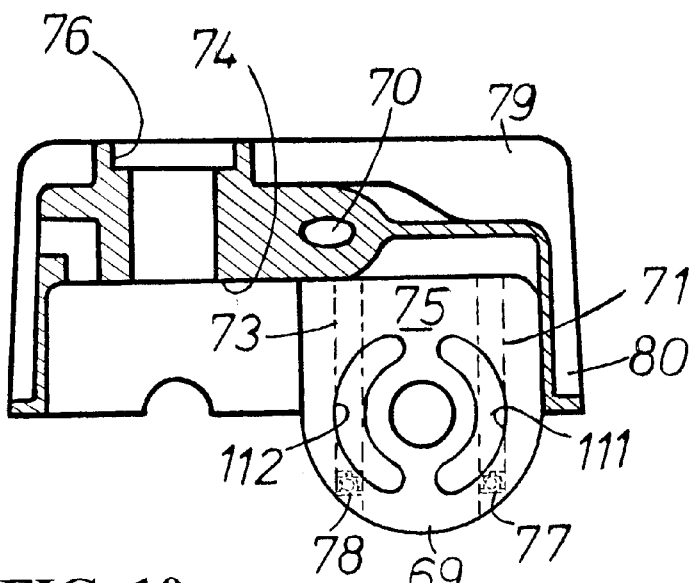
FIG. 10 is a sectioned side view on line III—III of FIG. 9.
Figure 11:
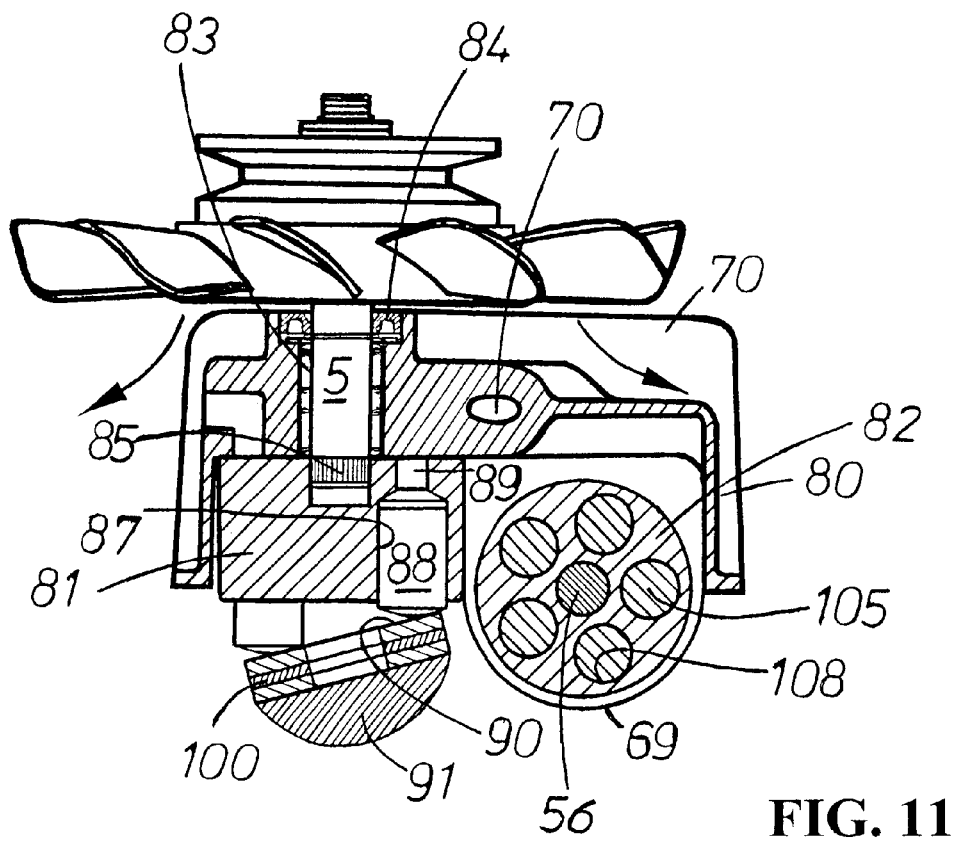
FIG. 11 is a sectioned side view on line III—III of FIG. 9 showing the relative positioning of the cylinder barrels.

As shown in FIG. 7, the first housing element 1 as well as the second housing element 2 are each provided with their own cavities shown as 25, 26 to provide space for the hydrostatic transmission and mechanical gearing respectively. Once all the internal components have been assembled in place in the transaxle, first and second housing elements 1, 2 can be joined to third housing element 3, the joining taking place for the purpose of definition at respective first and second junction surfaces indicated as 31, 32. A series of opened-ended holes marked 27 surrounding cavity 25 and a similar series of holes 28 surrounding cavity 26. Each series of holes 27, 28 correspond with respective sets of tapered blind holes 29, 30 in the third housing element so that self-threading screws 11 are disposed in holes 28, 30 whereas self-threading screws 12 are disposed in holes 27, 29.

Preferably but not essentially, first and second junction surfaces 31, 32 lie on the same plane, in other words both first and second housing elements 1, 2 are joined to the third housing element 3 along the same parting plane shown as 22 in FIGS. 1 & 2. Although not essential, the single output transmission shaft or as shown the two output axle transmission shafts 9, 10 are preferably positioned in the housing with their axes of rotation coincident with parting-plane 22.

Cavities 16, 25 in first and third housing elements 1, 3 when combined form a first chamber 36 for the hydrostatic transmission 17, whereas cavities 18, 26 in second and third housing elements 2, 3 when combined form a second chamber 37 for the speed reduction gearing 19 and differential 20. Sealing compound of either a silicon or anaerobic type applied over first and second junction surfaces ensure chambers 36, 37 are sealed and protected from the outer exterior environment of the transaxle 1. Chamber 36 remains flooded with hydraulic fluid which acts as the power transmitting medium for the hydraulic pump depicted by arrow 39 and motor depicted by arrow 40 of the hydrostatic transmission 17 and may be connected to a remote overspill tank (not shown) to allow for an increase in the volume of fluid when hot. Although first and second chambers 36, 37 may be flooded and each sharing the same fluid, it is preferable the chambers 36, 37 be either segregated from each other or alternatively, be allowed to be in communication with each other via a filter membrane barrier.

As best seen in FIGS. 5 & 6, third housing element 3 is provided with a number of semi-cylindrical pockets to carry a number of bearings which provide the support for various shafts. For instance, pockets 41, 42 are for bearings 43, 44 on which various elements of the speed reduction gear train 19 are mounted that combine with pockets 45, 46 provided in the second housing element 2 as shown in FIG. 7.

However, pocket marked as 50 in the third housing element 3 combines with both pocket 52 in the first housing element 1 and pocket 53 in the second housing element 2 to provide support for a hollow bridging element 55 which is depicted in FIG. 7 as spanning the gap between first and second housing elements 1, 2. In the example used to illustrate the hollow bridging element, a cylindrical bearing member is depicted in the role of the hollow bridging element 55, the bearing spanning the semi-cylindrical pockets 52, 53 provided in the otherwise separate first and second housing elements 1, 2.

The hollow bridging element 55 therefore is a device that is used to allow the passage of a connecting shaft 56 so that the output of the hydrostatic transmission 17 in the first chamber 36 can be mechanically coupled to the input side of the speed reducing gearing 19 in the second chamber 37. As a result of the connecting shaft 56 passing through the interior of the hollow bridging element 55, it is not exposed to the exterior of the transaxle. In this preferred manner, hollow bridging element 55 allows communication between the first chamber 36 and the second chamber 37, which may or may not allow fluid to pass from one chamber to the other or vice. Although the hollow bridging element 55 as shown in all these embodiments comprises a cylindrical bearing, its definition is meant to cover all variations such a rotary seal that could be placed in the position shown for the bearing or a tube through which the connecting shaft 56 would pass. As such, the rotary seal member or tube member would perform the same function as the cylindrical bearing member used in these illustrations. Be the bridging element 55 a rotary seal or a bearing or just an tube, anaerobic sealant would be smeared at the interface where the bridging element 55 is in engaging contact with pockets 50, 52, 53 in the housing elements 1, 2, 3 so that external moisture or contamination is unable to enter either of the chambers 36, 37. For ease and convenience, the outer profile for the bridging element 55 best suited to accomplish the task is cylindrical as depicted but the outer profile could be modified, for instance to being square, and still work.

Further pockets 59, 60 disposed in the second and third housings element 1, 2, 3 in order to support a rotary seal 61 as shown in FIG. 5.

In instances when it is advantageous that the first and second chambers 36, 37 be in fluid communication with each other, a filter membrane 62 can be included that surrounds connecting shaft 56. In this case, as rotary seal 61 is not required, it being removed from pockets 59, 60. The filter membrane 62 could as example be a hollow cylindrical sintered bronze component, and once in position in the communication passages between first and second chambers 36, 37, the membrane 62 can allow the flow of fluid from one chamber to the other. However, the membrane would act as a barrier in preventing relatively large-sized contamination debris from the gearing compartment 37 from being drawn into the hydrostatic compartment 36 where it could accelerate wear in the hydrostatic transmission 17.

It is also intended that this invention cover an arrangement whereby the power transmission link spanning chambers 36, 37 is not protected by any bridging element at all, and where in this arrangement, that portion of the connecting shaft 56 comprising the power transmission link is exposed to the outer environment of the hydrostatic transaxle. In that respect, provided two rotary seals are used instead of one as shown, each seal being located adjacent the interface between respective first and second housing elements 1, 2 and the third housing element 3, no contamination can enter chambers 36, 37. In the housing variation where a single cover housing element used in combination with two lower case housing elements, as the exposed portion of connecting shaft would be lying downwards in orientation, any dirt present from the environment is unlikely to collect in the small gap existing between the connecting shaft and housing.

Referring now to FIGS. 7, 9, 10 & 11, first housing element 1 contains within its wall structure a number of fluid passages which provide the fluid link between the pump and motor. When for instance the first housing element is manufactured as a aluminium die-casting, its relatively small overall size lends itself to a simple resin impregnation process in the event of porosity. As shown common to all these embodiments, preferably the first fluid passage comprises a horizontal leg 70 and a vertical leg 71 whereas the second fluid passage comprises horizontal leg 72 and vertical leg 73. Vertical legs 71, 73 run over a part of their distance adjacent the exterior wall near heat radiating fins 80. First passage 70, 71 and second passage 72, 73 form a closed-loop circuit within first housing element 1 to connect together the respective pump and motor mounting surfaces marked 74, 75. A portion of the motor mounting surface 75 as shown is formed on the side surface of a rising 69 erected from the first housing element 1, rising 69 extending across the parting-plane 22 to protrude into cavity 16. A non-return check-valve 77 is included in vertical leg 71 and a similar check-valve 78 is included in vertical leg 73. Such check-valves 77, 78 allow the admittance of make-up fluid in either of the two passages 70, 71 or 72, 73 in order that the hydrostatic transmission 17 can recover any fluid loss during operation because of leakage.

The first housing element 1 is provided with an aperture 76 and where a horizontal series of external projecting heat dissipating fins 79 extend from the aperture 76 to substantially cover at the exterior top surface of the first housing element 1. Preferably a further series of a vertical series of fins 80 are included running down the length on one side of the first housing element 1. Bearings 83 and a rotary seal 84 is disposed in the aperture 76, and where the input drive shaft 5 supported by bearings 83 extends completely through aperture 76 into first chamber 36 to engage by means of splines the cylinder-barrel 81 of the pump 39.

The shaft-driven fan 7 produces an air flow over the fins 79, 80, and heat is thereby extracted from the neighbouring fluid power transmitting passages 70, 71 and 72, 73 more effectively than the prior art hydrostatic transaxles presently on the market which locate that component having such passages inside the surrounding housing and not integral with the wall structure of the housing.

The respective cylinder-barrels 81, 82 of the hydraulic pump 39 and motor 40 are mounted perpendicular to one another such that the rotating axis of the pump cylinder-barrel 81 is co-axial with input-drive shaft 5 whereas the rotating axis of the motor cylinder-barrel 82 is parallel to the rotating axes of the axle-shafts 9, 10. Cylinder-barrel 81 engages the pump mounting surface 74 and cylinder-barrel 82 engages the motor mounting surface 75.

The cylinder-barrel 81 of the pump 39 is provided with a plurality of axial cylinder-bores 87, each bore 87 containing a respective piston 88 and where each piston 88 is being axially urged outwards by a spring (not shown) located behind the piston 88 in the bore 89. The outer end of the piston 88 is generally domed-shaped to be operatively connected to an adjacent operating surface 90 on thrust bearing 100 of the swash-plate 91 by the bias produced by springs. The action of the springs behind each of the pistons 88 produces a counter reaction which loads the cylinder-barrel 81 on the pump mounting surface 74. Each cylinder-bore 89 has a port 92 so arranged to communicate in sequence with a pair of arcuate ports 93, 94 provided on the pump mounting surface 74 that connect with respective horizontal legs 70, 72.

As shown in FIG. 6, a pair of raised part-cylindrical bearing surfaces 96, 97 are disposed in the interior of cavity 16 onto which the swash-plate 91 of the pump 39 is seated. The swash-plate 91 that its inclination angle can be varied in both directions from its neutral or zero-inclination point by movement over raised part-cylindrical bearing surfaces 96, 97. The swash-plate 91 carrying a thrust bearing 100 with operating surface 90 is shown in FIG. 12 has a groove 101 provided to one side in which pin 102 slides. The pin 102 is connected by arm 103 to the control shaft 13 which external to the housing is connected by linkage to a foot pedal. Rotary movement of the control-shaft 13 causes the swash-plate 91 to incline in angle in respect of the stroking axis of the pistons 88, and thereby the stroke of the pistons 88 is changed. The amount of piston 88 stroke determines the amount of fluid displaced in the cylinder-bore 89 per each single rotation of the cylinder-barrel 81, and hence the swept volume of the pump 39 in both directions can be changed by altering the amount of piston stroke so that the amount of fluid delivered to the hydraulic motor 40 is precisely controlled.

The cylinder-barrel 82 of the motor 40 is almost in all respects identical to that of the pump 39, and carries a series of pistons 105 which are operatively connected to the operational surface 106 of thrust plate 107. Each piston 105 is housed in its respective cylinder-bore 108 provided within cylinder-barrel 82, and each cylinder-bore 108 has a port 110 so arranged to communicate in sequence with a pair of arcuate ports 111, 112 provided by the motor mounting surface 75 that connect with respective vertical leg s 71, 73. Thrust plate 107 is supported by an insert 115 located between the first and third housing elements 1, 3 Fluid entering the cylinder bores 108 causes the pistons 105 to move axially outwards and because of their reaction on the operational surface 106 of thrust-plate 107, an angular driving moment is created on the cylinder-barrel 82 which is caused to revolve. The cylinder-barrel 82 of the motor is mechanically engaged by spline 116 to connecting shaft 56 and thus rotation of the cylinder-barrel 82 causes rotation of connecting shaft 56, and mechanical power is thereby transmitted through the speed reducing gears 19 to the differential 20 and axle output shafts 9, 10 of the hydrostatic transaxle which in the case of a vehicle application such as a lawn tractor, are attached the drive wheels of the vehicle.

Although not always necessary, on occasion it may be desirable to able to disconnect the drive wheels of the vehicle from the engine. This is useful in instances when it is desired to manually push the vehicle without operating the engine that is normally is used to drive the transaxle and propel the vehicle. This can be achieved by disconnecting the hydrostatic fluid circuit between the pump and motor or by disconnecting the hydraulic motor from the speed reducing gearing. Regarding the later, as shown with reference to FIGS. 5 & 13, a mechanical disengage mechanism indicated by arrow 120 can be incorporated within the second chamber 18 to operate in association with the connecting shaft 56.

Connecting shaft 56 is provided with a central spline portion 121 on which collar element 122 is fixed to rotate at equal speed. Collar 122 is provided with a recessed female gear profile at one end as marked 123 as it able to slide axially along spline 121. Collar 122 is provided with a groove 124 on its outer diameter into which the in-turned end 125 of prong 126 is slidingly engaged. Selector prong 126 is fixed to spindle 15 and where rotation of spindle 15 causes the in-turned end 125 of selector prong 126 to axially shift collar 122 to swallow a portion of adjacent male gear profile 127 in its recess such that the shaft 56, collar 122 and gear 127 rotate at equal speed. When spindle 15 is rotated in the opposite direction, selector prong 126 causes collar 122 and gear 127 to separate, this being the position shown in FIG. 5, which corresponds to the hydrostatic transmission 17 and gear reduction gearing 19 being disengaged from each other. Note however that in this position the internal brake depicted by arrow 130 can still be engaged so that a "vehicle runaway condition" is avoided. Such a parking brake 130 is useful in that it ensures the vehicle can be arrested during periods when the hydrostatic transmission 17 is disconnected from the gearing 19.

With particular reference to FIGS. 5, 14 & 15, the brake mechanism 130 comprises of one or more brake pads 131, 132 which can be loaded against wheel 133 when the brake spindle 14 is operated. Wheel 133 is formed with an integral central hollow cylindrical portion 134 including the previously mentioned male gear profile 127. The wheel 133 is journalled to spin freely on connecting shaft 56 and connecting shaft is supported by a combination of the bearing acting as the hollow bridging element 55 and bearing 135. For certain applications it is desirable to position both brake and disengage spindles 14, 15 side-by-side in the housing as shown in FIG. 2 in order to simplify the external linkage required to connect such spindles to the operator console in the vehicle. In event that components such as the brake shoes 131, 132 wear out during the service life of the transaxle, this invention will allow simple repairs to be undertaken as the second housing element 2 can be removed from the third housing element 3 and the worn parts replaced.

Figure 16:
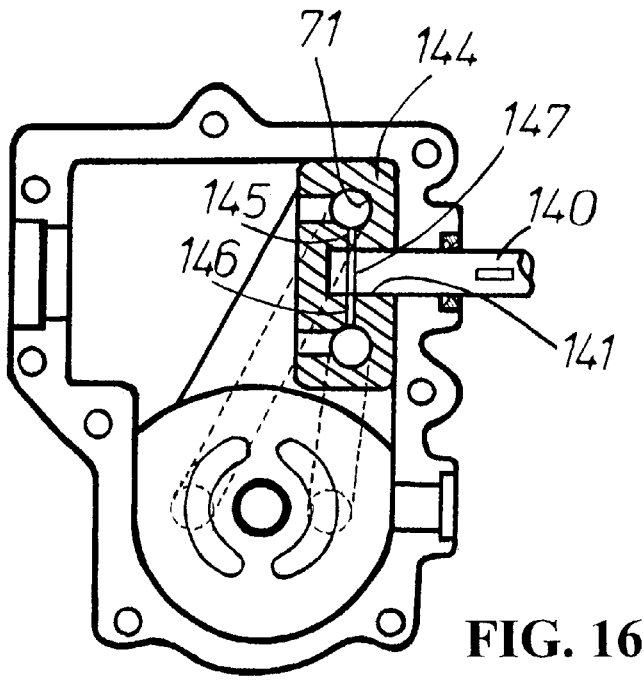
FIG. 16 depicts an alternative form of internal disengage mechanism for the hydrostatic transaxle with the addition of a "wide-band-neutral" fluid release in its activated position.
Figure 17:
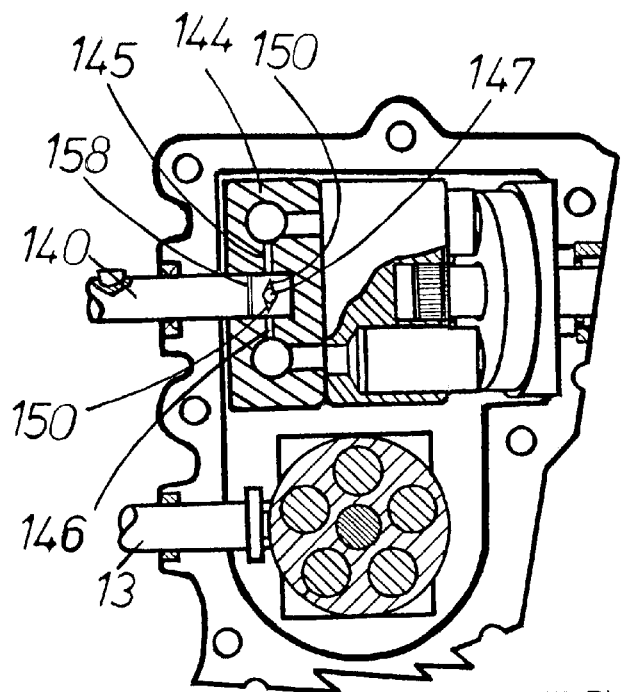
FIG. 17 depicts the "wide-band-neutral" fluid release of FIG. 16 in its non-activated position.

In the event that it is still necessary to included a disconnecting device between the drive wheels of the vehicle from the engine other than such a device as just described, an alternative solution would be to short-circuit the closed-loop circuit between the pump and motor by including a bleed valve. As shown in FIGS. 16 & 17 the bleed valve comprises a shaft 140 which is supported between first and third housing elements 1, 3 and extends into a bore 141 formed on one side of a rising 144 erected from the first housing element 1. The bore 141 is connected by holes 145, 146 to respective vertical legs 71, 73 and where that portion of the shaft 140 engaged in bore 141 has cross-drilling 147 so that cross-drilling 141 can be tuned in-phase with holes 145, 146 as shown in FIG. 16 when the pump 39 is at or near the neutral point (ie. zero inclination angle of the swash plate 91). In this position, the vertical legs 71, 73 are in fluid communication with each other through holes 145, 146 and cross-drilling 147 and the vehicle can be manually pushed without starting the engine. Once the shaft 140 is further rotated to the position shown in FIG. 17, cross-drilling 147 is no-longer in fluid communication with holes 145, 146, and as a result, no short-circuiting of fluid between vertical legs 71, 73 can take place. The addition of a vee-groove 150 in association with cross-drilling 147 provides the hydrostatic transmission with a simple and economic form of "wideband neutral" feature. A "wide-band neutral" can be a useful addition for the hydrostatic transmission as often it is difficult to find the exact neutral point between forward and reverse. By including such a "wide-band neutral" feature, it is easier for the operator to find neutral because even if the swash-plate of the pump remains inclined with respect to the axis of piston stroke, the reciprocating action of the pistons forcing fluid into the passages can be diverted through the vee-groove and cross-drilling before it can reach the motor where otherwise it would to cause the motor assembly to rotate and hence the vehicle to move.

A further refinement may be included in the hydrostatic with or without being combined with such a cross drilling, this being achieved by including a superficial groove 158 over the whole or only part of the circumferential distance of shaft 140 juxtapose holes 145, 146. Superficial groove 158 is shown in FIG. 17 in a false position to one side of holes 145, 146, whereas in reality is would be in-phase with such holes. In its complete form, superficial groove 158 covers the complete circumference of shaft 140 whereas in its shortened form, its circumferential distance covers the length of distance between holes 145, 146 on one side only. Thereby, either way, a controlled "vibration damping effect" is achieved for the hydrostatic transmission.

Were cross-drilling 147 also present, the addition of superficial groove 158 would create a fluid link between holes 145, 146 even when the position of bleed valve shaft 140 means that cross-drilling 147 is not itself in communication with such holes 145, 146.

Although the addition of such a superficial groove 158 would in practice lower the volumetric efficiency of the hydrostatic transmission as it in effect leaks high-pressure fluid from the high-pressure side of the hydrostatic transmission to the low pressure side, the amount of fluid loss is slight and therefore not a concern. To avoid any such loss occurring during vehicle constant speed forward motion or acceleration in forward, then it is an easy matter to limit the circumferential length of superficial groove so that it only travels the distance between holes 145, 146 on side of bleed valve shaft 140. With such a short length superficial groove, controlled leakage can then only take place during the reverse mode of vehicle operation or during vehicle deceleration in forward when in effect the motor of the hydrostatic transmission in effect operates as a pump. As a result, no leakage of fluid can occur when achieving optimum volumetric efficiency really counts.

Figure 18:
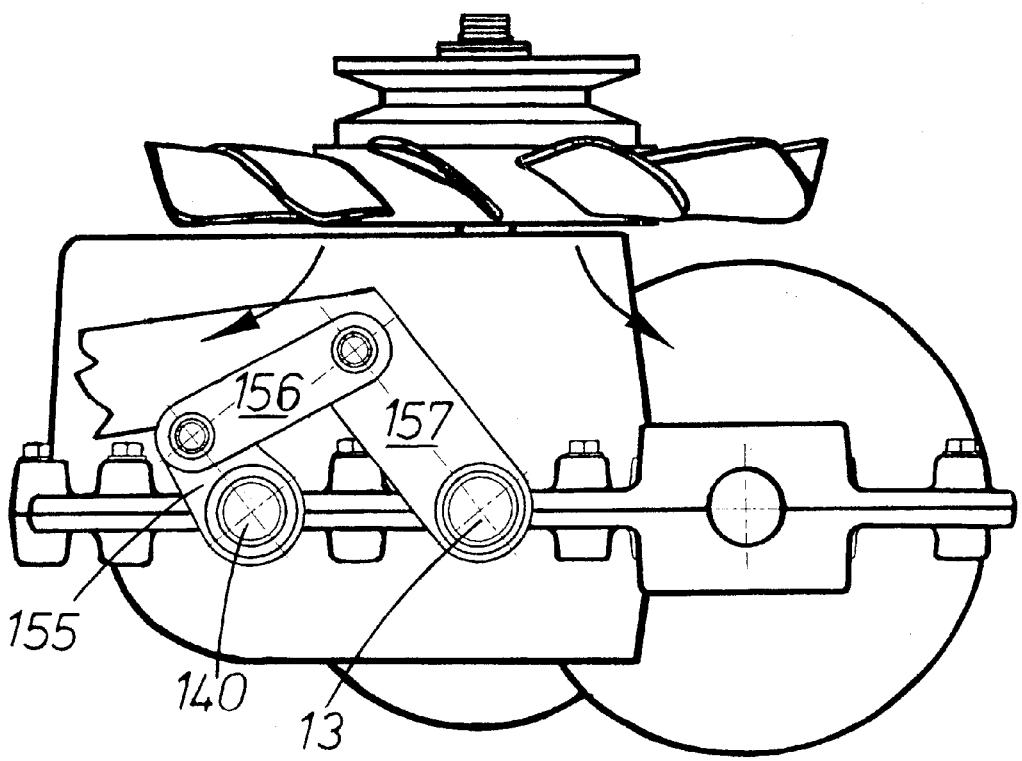
FIG. 18 is an external view of the hydrostatic transaxle of FIG. 2 with the addition of external control linkage linked to the internal disengage mechanism and "wide-band-neutral" fluid release of FIGS. 16 & 17.

FIG. 18 shows how shaft 140 can if be linked to control-shaft 13 by way of external linkage arms 155, 156 which operate in association with lever 157. By varying in the span or arm length of the linkage arms 155, 156, it is possible by just external adjustment or replacement of such linkage arms to obtain varying characteristics for the "wider band neutral" and "vibration damping effect" to suit each particular application. This saves time and expense compared to designs where each hydrostatic transmission has to be built with a specific characteristic and where any change later needed requires the unit to be disassembled to make the necessary internal adjustments. A further advantage of including such a superficial groove on bleed valve shaft 140 is that any dirt particles getting lodged in groove 158 are better able to escape due to the relative movement between shaft 140 and its surrounding bore 141, the relative movement occurring due to shaft 140 being connected by arms 155, 156 to control-shaft 13.

In respect of the aforementioned rising 69 or 144 erected from the first housing element 1 that in part provides the motor mounting surface 75, in an alternative form the rising as well as the vertical legs 71, 73 within the wall structure of housing element 1 could be replaced by a generally rectangular block having such legs and a motor mounting surface and where the block is mounted to the bottom of the interior cavity 16 for connection to the horizontal legs 70, 72 containing the first housing element.

Gear 127 once mechanically fixed to rotate at equal speed with connecting shaft 56 by its engagement to collar 122, meshes with gear 160 fixed to intermediary-shaft 161. Intermediary shaft 161 being supported by bearings 43, 44 and carries a further gear 162 fixed to it that meshes with the ring-gear 163 of the differential unit 20. The differential unit 20 shown is of the type that has four bevel gears 164, 165, 166, 167 of which 166, 167 are attached to respective axle output shafts 9, 10 that extend out from the differential unit 20 to be external to the housing. The inclusion of a mechanical differential is important as it allows normal differentiation between the left and right drive wheels of the vehicle and helps prevent lawn damage especially when tight turns are undertaken. For those applications where there is no requirement to have a differential effect, shafts 9, 10 would in effect be a single shaft. Gear 163 would be modified so to omit bevel gears 164, 165, 166, 167 and be fixed to the output shaft. The output shaft would still protrude from the housing, and in the case of a single axle shaft, the output shaft could be arranged to extend outwardly on one or both sides of the housing to suit the application.

To operate the hydrostatic transaxle, by means of appropriate selection or adjustment of the inclination of the swash-plate 91 of the pump 39 by means of the control-shaft 13, the hydrostatic transmission speed ratio is altered. Rotation of the input-shaft 5 causes cylinder-barrel 81 to rotate and results in reciprocation of pistons 88. Fluid is then delivered from the pump 39 to the motor 40 through passage legs 70, 71 or 72, 73 (depending on which direction of flow occurs from the pump) to enter the cylinder-barrel 82 of the motor 40 and cause the pistons 105 to reciprocate in their respective bores 108 by way of their angle of attack against the operational surface 106 of the inclined thrust-plate 107. The side force is created by the pistons 105 on the wall of each bore 108 in those bores subjected to pressurised fluid causes rotation of the motor cylinder-barrel 82 about its longitudinal or central axis of rotation. Cylinder-barrel 82 in turn rotates connecting shaft 56 and mechanical power is transmitted through the gears 122, 160, 162 to the differential unit 20 for the purpose of torque multiplication. Bevel gearing 164, 165, 166, 167 in the differential unit 20 then determines the respective speeds of the axle output shafts 9, 10 that drive the wheels of the vehicle.

This invention covers the variation where the rotational axes of any of the shafts such as the connecting shaft 56, the intermediate shaft 161, or the axle output shafts 9, 10 can be offset from the parting plane 22 so that they are no-longer coincident with the parting plane.

Figure 19:
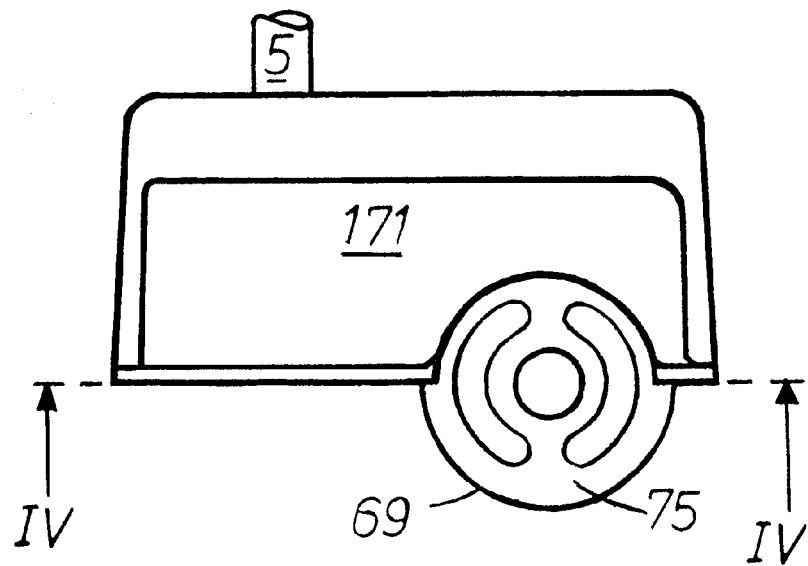
FIG. 19 is an external side view of a modified form of transmission cover element.
Figure 20:
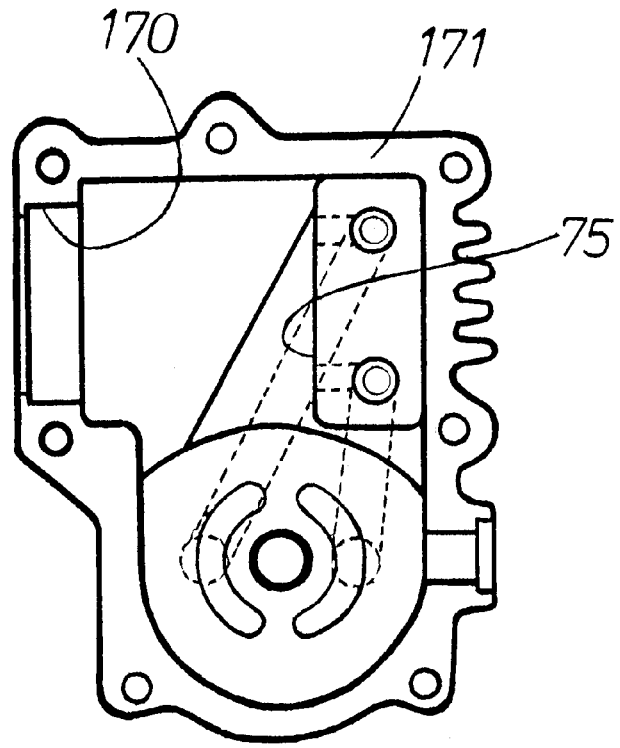
FIG. 20 is a sectioned plan view on line IV—IV of FIG. 19.
Figure 21:
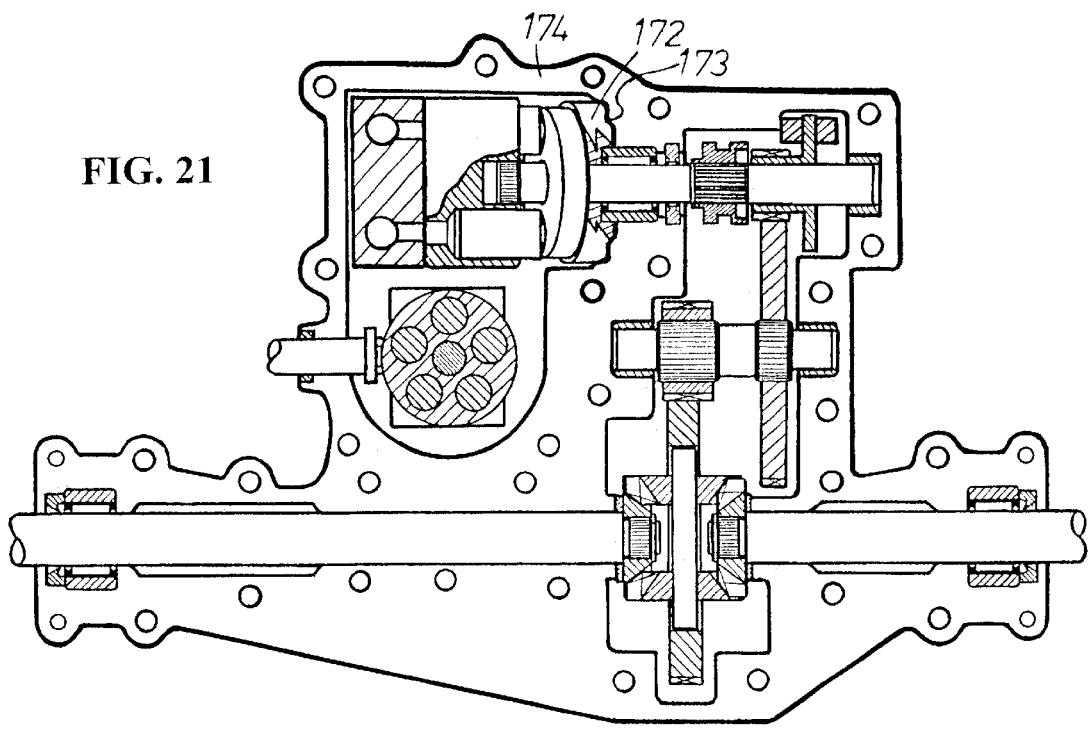
FIG. 21 is a plan view of a modified form of case element used in combination with the transmission cover element of FIG. 19.

In a modified from of housing for the invention as shown as FIGS. 19 to 21, a substantially larger diameter semi-cylindrical opening 170 is used in place of pocket 52 of the earlier embodiment. Such an enlarged opening 170 may help the machining of motor mounting surface 75 as the external view of modified first housing element 171 in FIG. 19 illustrates. Into enlarged opening 170, a modified insert 172 for the motor thrust plate 107 is seated, this modified insert 172 being shown in FIG. 21 as being seated in an opposing equal sized semi-cylindrical opening 173 provided in a modified third housing element 174. In effect, respective opening and openings 170, 173 in first and third housing elements 171, 174 engage insert 172 which contrasts with the earlier embodiment where the first and third housing elements 1, 3 engage bridging element 55.

Figure 22:
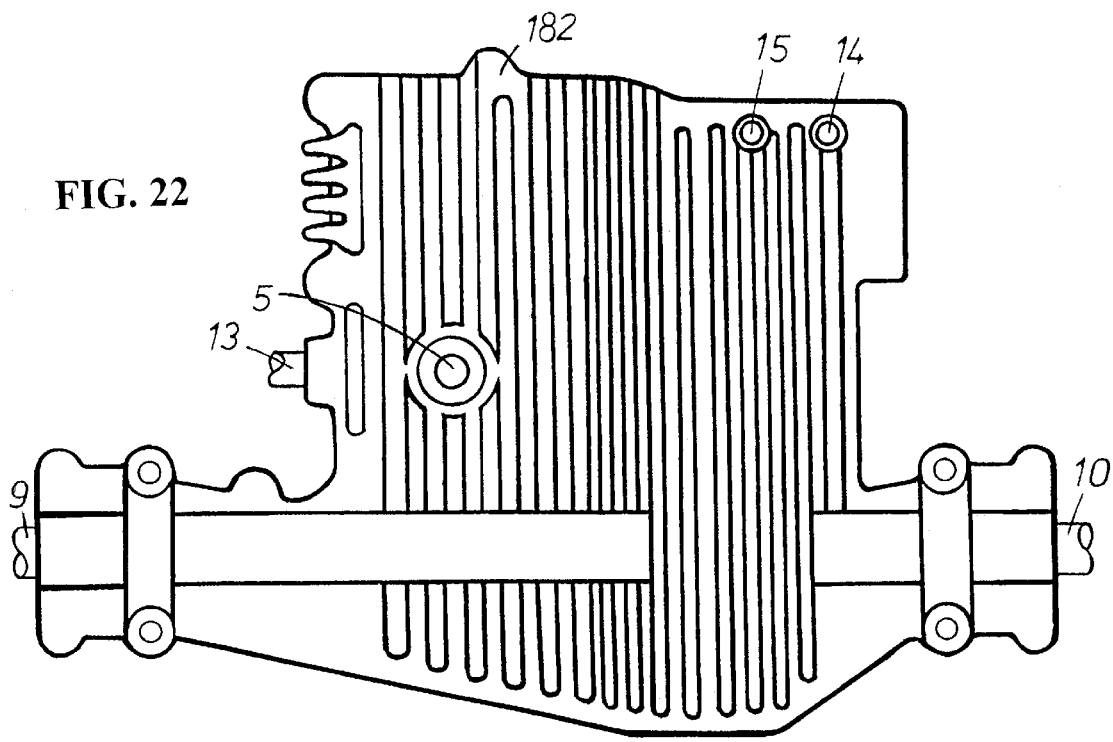
FIG. 22 is an external view from above of an alternative construction of hydrostatic transaxle according to the invention where only a single cover element is utilised.
Figure 23:
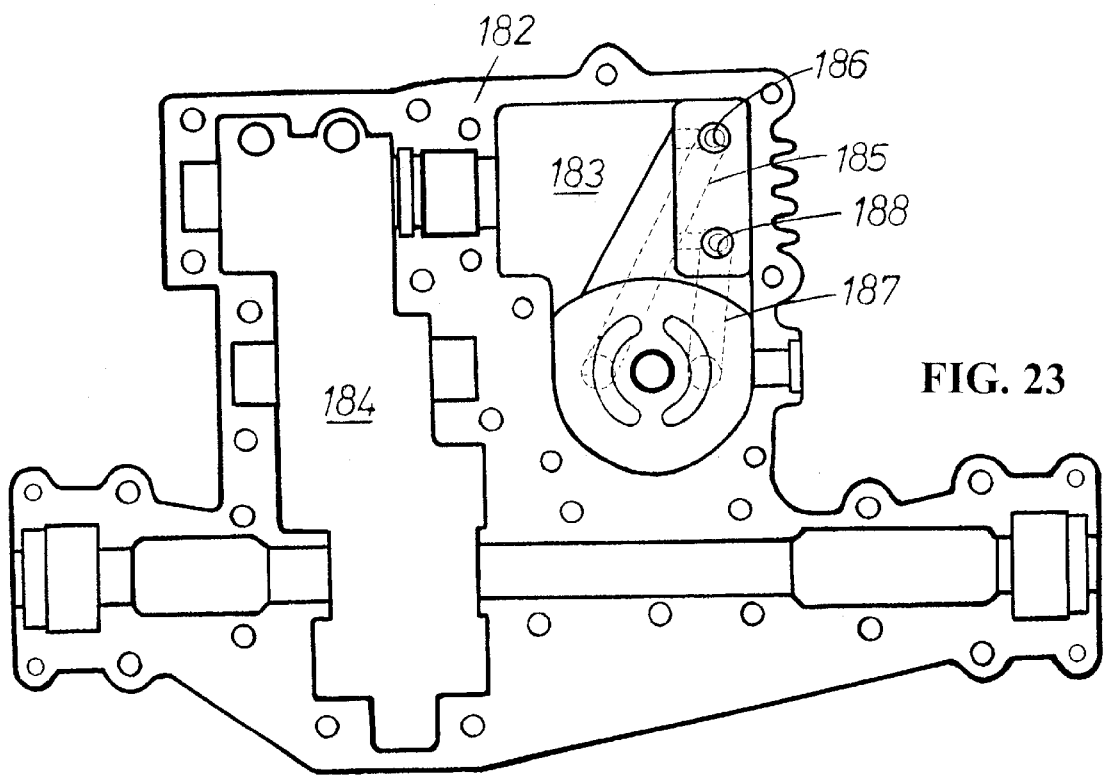
FIG. 23 depicts the interior of the single cover element of FIG. 22.
Figure 24:
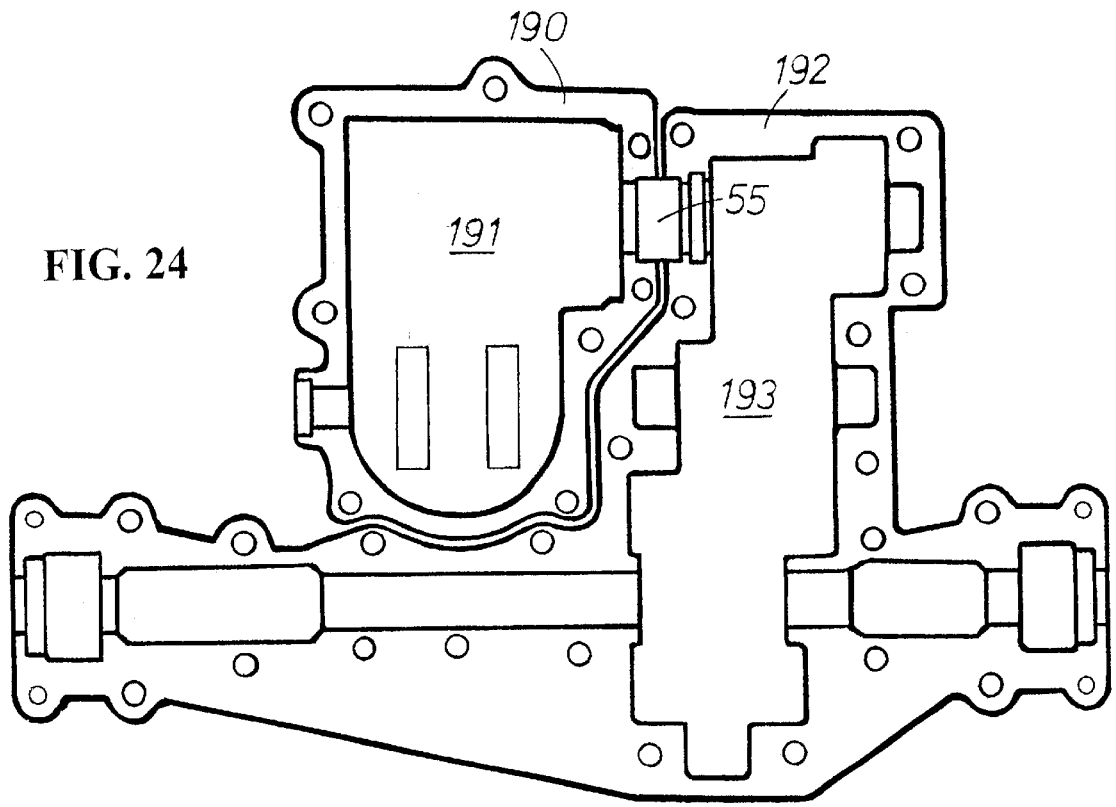
FIG. 24 depicts the interior of the two case housing elements used in this alternative construction of hydrostatic transaxle.

In contrast with the first embodiment of the invention, the alternative embodiment of the invention shown as FIGS. 22 to 24 substitutes the two upper cover elements with a single element and the lower single case element with two case elements. Therefore as shown in FIG. 22, the upper cover element 182 rotatably supports input drive-shaft 5 and on its underside, as shown in FIG. 23, includes two cavities, the first cavity 183 providing space for the hydrostatic transmission and the second cavity 184 providing space for the speed reducing gearing and differential. Upper cover element 182 contains within its wall structure fluid passages which provide the fluid link between the pump and motor, these comprising a horizontal leg 185 and a vertical leg 186 to complete the first fluid passage, and a horizontal leg 187 and vertical leg 188 to complete the second passage. As shown in FIG. 24, transmission case element 190 has a cavity 191 which combines with cavity 183 to form the first chamber whereas gear case element 192 has a cavity 193 which combines with cavity 184 to form the second chamber. Bridging element 55 of the type already described for the first embodiment is used to span the gap between transmission case element 190 and gear case element 192 to allow communication between the first and second chambers.

Figure 25:
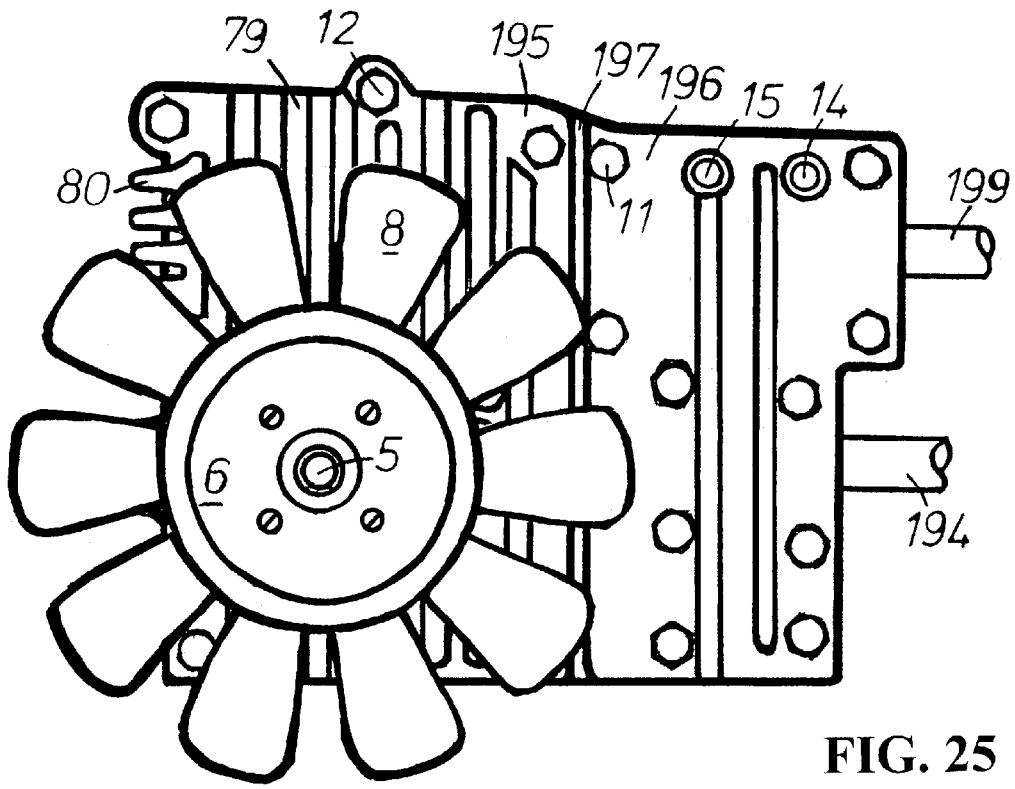
FIG. 25 is an external view from above of a housing construction used for a hydrostatic transmission unit according to the invention.
Figure 26:
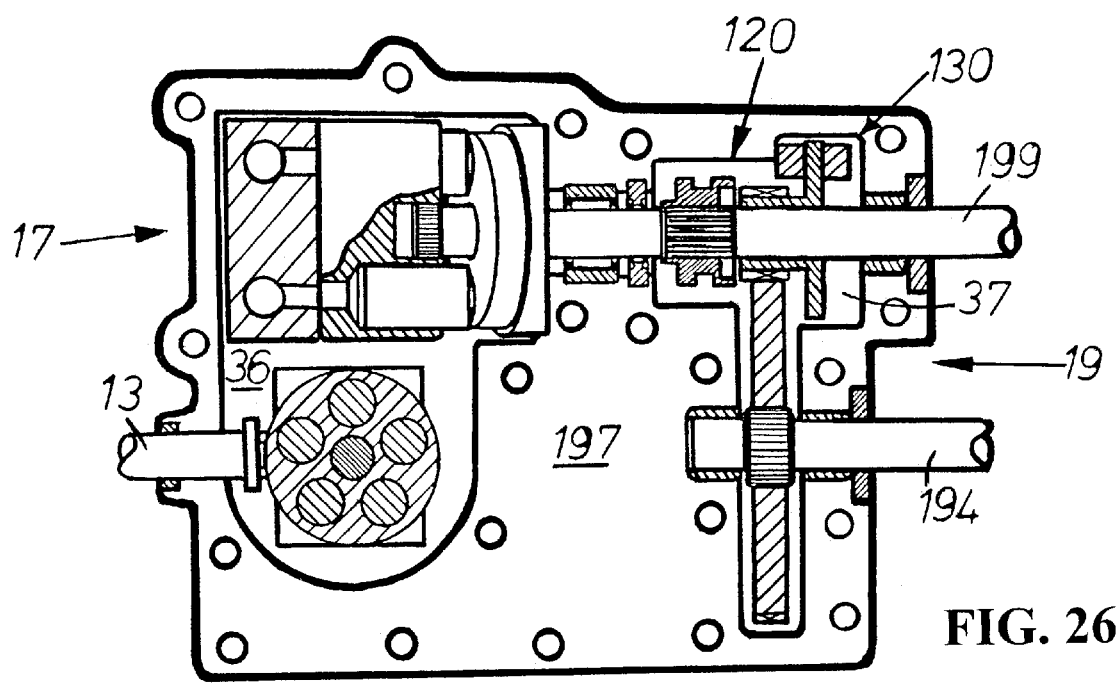
FIG. 26 is a plan view of the hydrostatic unit of FIG. 5 with the two cover elements removed to show the location of the hydrostatic transmission and speed reducing gearing within the case housing element.

The final embodiment of the invention shown in FIGS. 25 & 26 contrasts with the earlier embodiments in that the mechanical differential and axles shafts are omitted. Here the hydrostatic transmission 17 is connected through reduction gearing 19 to an output shaft 194. The housing has first and second housing elements called the transmission cover element 195 and the gear cover element 196 and a third housing element called the lower case element 197. The hydrostatic transmission 17 is contained within housing elements 195, 197 whereas the speed reducing gearing 19 is contained within housing elements 196, 197. As also shown, the earlier connecting shaft 56 can be extended if required, as here shown as shaft 199, so that shaft 199 forms the output shaft for the unit for instances when speed reduction gearing 19 is omitted. Disengage 120 and brake mechanisms 130 being in this embodiment connected to shaft 199.

It should be noted however that all embodiments of the invention may be modified so that the input drive-shaft extending from the housing can be located on that side of the housing which is directly opposite to where the fluid passages are disposed.

Although axial piston swash-plate units are used to illustrate and describe this invention, for certain applications, there may be advantage in substituting the fixed-displacement axial piston swash-plate hydraulic motor with that of another type. For instance, a fixed-displacement external geared hydraulic motor could be used instead and where the gears of the motor in this instance would be journaled in bores provided in the same housing element containing the fluid passages linking the pump to the motor and fed with fluid by a fluid coupling surface provided in such bores. Alternatively, a variable-displacement vane pump could be used in place of the axial piston swash-plate pump and a fixed-displacement vane motor used in place of the axial piston swash-plate motor.

A charge and/or power take-off auxiliary pump, preferably of the gerotor internal gear type may also be disposed in the same housing element that contains the fluid passages linking the pump to the motor of the hydrostatic transmission. The gerotor pump being driven by the input drive shaft and having fluid passages and valves arranged in the same housing element to suit the needs of the application. A further advantages in this arrangement would allow the pressure setting of the gerotor pump to be adjusted easily as the pressure relief-valve would have an external adjustment; the fan cooling effect of the present invention would help keep the fluid delivered by the gerotor pump to be kept as cool as possible; all the external connections can be arranged to be near the top of the transaxle thereby minimising the chances of being damaged.

In accordance with the patent statutes, we have described the principles of construction and operation of our invention, and while we have endeavoured to set forth the best embodiment thereof, we desire to have it understood that obvious changes may be made within the scope of the following claims without departing from the spirit of our invention.

We claim:

1. An axle driving assembly comprising a housing constituted by first and second housing elements disposed adjacent one another on one side of a parting plane, and a third housing element disposed on the opposite side of said parting plane and connected to each of said first and second housing elements, said first and third housing elements together defining a first chamber in which a hydrostatic transmission is disposed and said hydrostatic transmission comprising a hydraulic pump and hydraulic motor, and said second and third housing elements together defining a second chamber in which a mechanical differential is disposed, said hydrostatic transmission and said mechanical differential being operatively connected together by speed reducing gearing disposed within said housing; and wherein one of said housing elements is provided with first and second fluid passages integral with its wall structure for fluidly coupling said hydraulic pump with said hydraulic motor.

2. An axle driving assembly according to claim 1 wherein that one of said housing elements having said first and second fluid passages is said first housing element.

3. An axle driving assembly according to claim 2 wherein said hydraulic pump and said hydraulic motor each have a rotatable cylinder-barrel and where said first housing element includes a pump mounting surface for mounting said hydraulic pump as well as a motor mounting surface for mounting said hydraulic motor, respective mounting surfaces being provided with a pair of valve ports coacting with each said cylinder-barrel and where the first fluid passage connects one valve port of each pair and the second fluid passage connects the second valve port of each pair.

4. An axle driving assembly according to claim 3 wherein said first and second fluid passages are in side-by-side relationship each having the form of a horizontal leg and a vertical leg; and a portion of said motor mounting surface is formed on the side surface of a rising erected from said first housing element, said rising extending across said parting-plane.

5. An axle driving assembly according to claim 4 wherein said vertical leg extends into said rising and terminates at a pair of the check-valves residing in said rising.

6. An axle driving assembly according to claim 4 wherein a section of said vertical leg resides adjacent to the exterior wall of said first housing element and the remaining section of said vertical leg resides in said rising.

7. An axle driving assembly according to claim 4 wherein said first housing element is joined along a first junction surface with the third housing element, said first junction surface defining a plane and where said first junction surface surrounds said first chamber at said plane and is provided with a plurality of holes for the location of fastening screws for holding said first and third housing elements together, and where said rising lies inwards of said first junction surface.

8. An axle driving assembly according to claim 7 wherein second housing element is joined along a second junction surface with the third housing element, said second junction surface arranged to lie to the same said plane as the first junction surface and where said second chamber is surrounded at said plane by said second junction surface, said second junction surface being provided with a plurality of holes for the location of fastening screws for holding said second and third housing elements together.

9. An axle driving assembly according to claim 8 wherein said housing can be dismantled such that said second chamber is unveiled for the replacement of mechanical components such as a worn brake pad without said first chamber being unveiled.

10. An axle driving assembly according to claim 1 and including an input power transmission shaft rotatably mounted in said housing and operatively connected to said hydraulic pump, a power transmission link in the form of a connecting shaft arranged to pass from said first chamber to said second chamber for the transmission of power between said hydraulic motor and said speed reducing gearing.

11. An axle driving assembly according to claim 10 and including a hollow bridging element disposed in said housing to allow communication between said first chamber and said second chamber, said hollow bridging element residing and supported in at least one pocket formed at said parting plane of said housing.

12. An axle driving assembly according to claim 11 wherein said hollow bridging element includes a seal, said seal acting to segregate said first chamber from said second chamber.

13. An axle driving assembly according to claim 11 wherein said hollow bridging element includes a filter, said filter allowing fluid within said first chamber to access said second chamber or vice versa.

14. An axle driving assembly according to claim 10 wherein said speed reducing gearing is connected via said mechanical differential to a pair of outwardly extending axle shafts rotatably mounted in said housing.

15. An axle driving assembly according to claim 14 wherein said axle shafts are disposed in a parallel relationship with respect to said parting plane.

16. An axle driving assembly according to claim 1 wherein a parking brake device and a mechanical disengage device are disposed within said second chamber and operatively connected to said connecting shaft.

17. An axle driving assembly according to claim 1 wherein said hydraulic motor is of the axial piston thrust-plate type and where said first and third housing elements are provided with a semi-cylindrical openings about said parting plane, support for said thrust-plate assembly being provided within said first chamber and lying directly adjacent said openings and where the opening in said first housing element is larger in diameter than that opening in said third housing element.

18. An axle driving assembly according to claim 1 and including a bleed valve disposed within said first chamber and a control shaft supported in said housing, said control shaft for controlling the hydraulic displacement of said hydraulic pump and operatively connected to said bleed valve to provide a wide-band neutral effect for said hydrostatic transmission.

19. An axle driving assembly according to claim 18 wherein said bleed valve when activated connects said first and second fluid passages together to short-circuit the normal fluid flow path between said hydraulic pump and said hydraulic motor.

20. An axle driving assembly according to claim 1 wherein that one of said housing elements having said first and second fluid passages is said third housing element.

21. An axle driving assembly according to claim 2 and including a series of external projecting heat dissipating fins projecting from said first housing element, said fins comprising an array disposed in a generally horizontal fashion lying generally parallel with respect to said horizontal leg of said first and second fluid passages, and including an input drive-shaft rotatably supported in said first housing element for driving said hydraulic pump, a fan disposed on said input drive-shaft external to said first housing element and having a plurality of blades whereby rotation of said input drive-shaft produces a substantially downward air flow pattern from said fan to be imparted over said external projecting heat dissipating fins.

22. An axle driving assembly according to claim 21 wherein said fins further comprising an array disposed in a generally vertical fashion lying generally parallel with respect to said vertical leg of said first and second fluid passages.

23. An axle driving assembly comprising a housing constituted by first and second housing elements disposed adjacent one another on one side of a parting plane, and a third housing element disposed on the opposite side of said parting plane and connected to each of said first and second housing elements, said first and third housing elements together defining a first chamber in which a hydrostatic transmission is disposed and said hydrostatic transmission comprising a hydraulic pump and hydraulic motor, and said second and third housing elements together defining a second chamber in which speed reducing gearing is disposed, at least one outwardly extending output power transmission shaft rotatably supported in said housing and where said hydrostatic transmission is operatively connected to said at least one outwardly extending output power transmission shaft by said speed reduction gearing, and wherein one of said housing elements is provided with first and second fluid passages integral with its wall structure for fluidly coupling said hydraulic pump with said hydraulic motor.

24. An axle driving assembly according to claim 23 and including a series of external projecting heat dissipating fins projecting from said first housing element, said fins comprising an array disposed in a generally horizontal fashion lying generally parallel with respect to said horizontal leg of said first and second fluid passages, and including an input drive-shaft rotatably supported in said first housing element for driving said hydraulic pump, a fan disposed on said input drive-shaft external to said first housing element and having a plurality of blades whereby rotation of said input drive-shaft produces a substantially downward air flow pattern from said fan to be imparted over said external projecting heat dissipating fins.

25. An axle driving assembly according to claim 24 wherein said fins further comprising an array disposed in a generally vertical fashion lying generally parallel with respect to said vertical leg of said first and second fluid passages.

26. An axle driving assembly comprising a housing constituted by first and second housing elements disposed adjacent one another on one side of a parting plane, and a third housing element disposed on the opposite side of said parting plane and connected to each of said first and second housing elements, said first and third housing elements together defining a first chamber in which a hydrostatic transmission is disposed and said hydrostatic transmission comprising a hydraulic pump and hydraulic motor, and said second and third housing elements together defining a second chamber in which speed reducing gearing is disposed, an input power transmission shaft rotatably mounted in said housing and operatively connected to said hydraulic pump, a power transmission link in the form of a connecting shaft arranged to pass from said first chamber to said second chamber for the transmission of power between said hydraulic motor and said speed reducing gearing, at least one outwardly extending output power transmission shaft rotatably supported in said housing and where said hydrostatic transmission is operatively connected to said at least one outwardly extending output power transmission shaft by said speed reducing gearing, a parking brake disposed within said second chamber and wherein said housing can be dismantled such that said second chamber is unveiled for the replacement of a worn brake pad without said first chamber being unveiled.

27. An axle driving assembly according to claim 26 and including a mechanical disengage device disposed within said second chamber juxtapose said parking brake.

28. An axle driving assembly according to claim 27 wherein a mechanical differential is disposed within said second chamber and drivingly connected between said speed reducing gearing and said at least one outwardly extending output power transmission shaft.

* * * * *